April 18, 1944. L. S. ALDRICH 2,346,892
TURN VALVE
Filed April 16, 1941
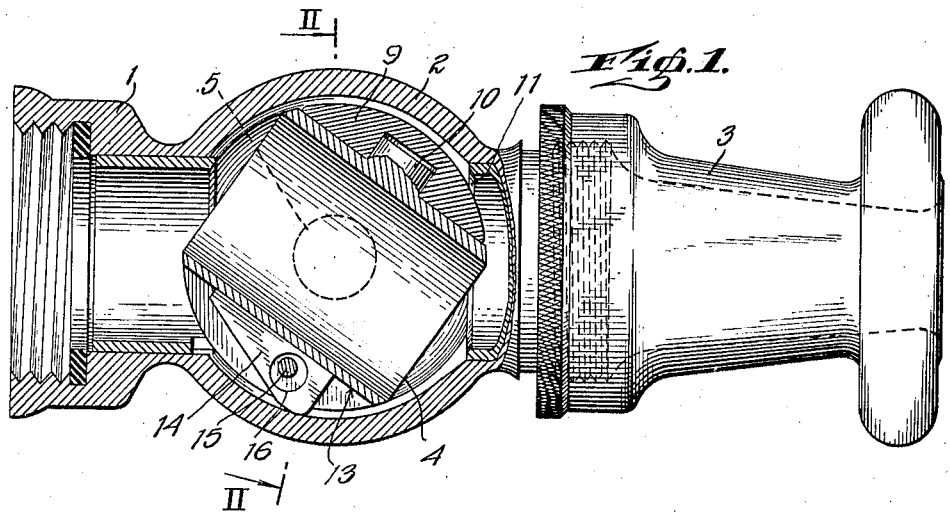
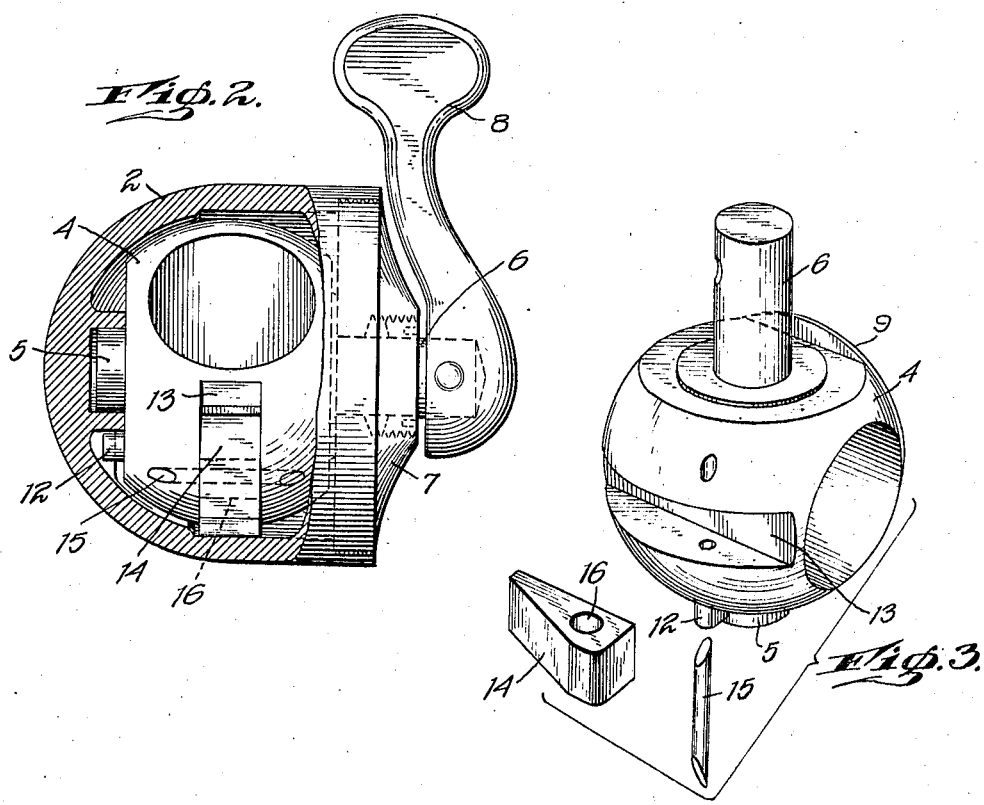
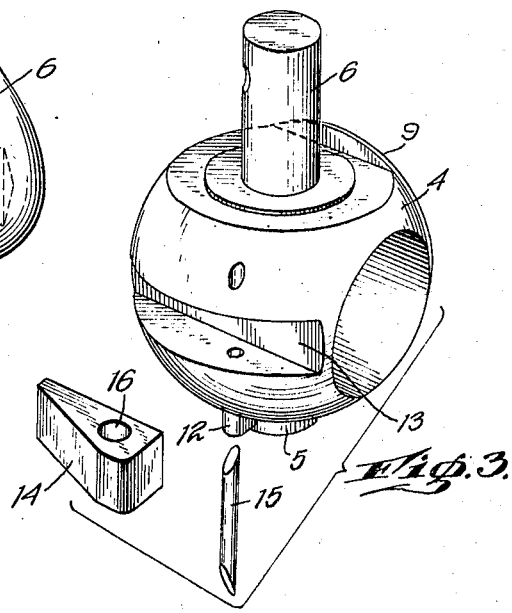
INVENTOR
Leo S. Aldrich
BY
Jeffery Kimball & Eggleston
ATTORNEYS Patented Apr. 18, 1944

2,346,892

UNITED STATES PATENT OFFICE 2,346,892

TURN VALVE

Leo S. Aldrich, Wellsburg, N. Y., assignor to American-La France-Foamite Corporation, Elmira, N. Y., a corporation of New York Application April 16, 1941, Serial No. 388,777

7 Claims. (Cl. 251—163)

The invention is an improved valve suited for various uses but representing a specific improvement in firemen's hose nozzles. In such nozzles it is desirable to regulate the water flow in order to adapt the range of the discharged stream to particular conditions as well as to shut it off entirely, and valves of the turn-plug type, turning through 90°, are preferred for this use.

It is known that if such valves are set up so that their plug members turn easily, which is of course desired, they do not then hold their adjustment. Unbalanced forces created by the flow of the water itself tend to rotate the plug, thus changing the adjustment and range and requiring continual readjustment, which is objectionable. More objectionable is the fact that the unbalanced forces referred to are strongest in the first half (45°) of the closing movement of the plug, the effect of which is that if the plug is given a start in the valve-closing direction, it is likely to make of itself a complete and sudden closure, producing a kick-back reaction of the nozzle which is dangerous to the fireman.

The obvious correction of this difficulty is impractical, because if such valves are tightened so as to establish such a degree of friction to plug-turning movement as will offset the closing tendency, then the pressure of the water upon the plug, augmenting its normal friction where it bears on the casing, so increases the total resistance that the valve is too stiff for convenient use. Since the water pressure may be different at different places and times, the establishment of an initial or normal resistance suited for all occasions is not practical and only hard and slow working valves therefore result.

By this invention the difficulty is eliminated by means of mechanism which makes the turning resistance dependent on, and more or less proportional to, the water velocity so that it changes automatically if and as the latter changes, being always sufficient in any event to hold the adjustment at which set, against the action of the forces referred to. This results in a valve which is never too stiff for convenient use but can yet be operated easily and adjusted quickly without danger to the fireman.

The valve shown in the accompanying drawing demonstrates the application of this principle in one of its many possible forms of use, specifically a hose nozzle, but without limitation to it.

Fig. 1 is an axial section of a fireman's shut-off nozzle partly in elevation; Fig. 2 is a section on line II—II thereof; and Fig. 3 is a perspective of the plug member disassembled.

The casing comprises a coupling part 1 adapted to be connected, for example, to the end of a fire hose, a chamber part 2 and a continuation or nozzle part 3, all of which parts may be formed integral if desired, but in the present case the tip is removably screwed on.

The valve chamber is shown as generally hemispherical in shape and the plug member 4 therein is spherical or shaped generally to correspond to the shape of the chamber. It is provided with a narrow gudgeon 5 at its inner end consituting a journal in the casing, and with a shank 6 at its outer end which is journaled in a packing gland in the casing cover 7, which latter is screwed into or on the valve chamber. The operating crank-handle 8 is pinned or otherwise attached to the outer end of the shank. The gudgeon and shank together constitute what may be termed an axle structure for the plug on which it is adapted to turn, the body part of the plug having no contact with the chamber wall. Thereby the normal frictional resistance to turning is mainly that of the axle mounting and gland, being slight as compared for example to valves in which the plug body bears on the casing, and is not subject to being greatly increased by the water pressing upon the plug member.

Control of the waterway through the plug and casing is by a spherical segment 9, constituting the valve member proper, which is loosely held on the spherical plug by a stud 10 and so that the turning of the plug carries it from an open position at one side of the nozzle axis to a closed position intersecting it. By its looseness on the stud the segment can fit its seat 11 tightly, unaffected by wear or disalignment but it is essentially a part of the turn-plug and is included within that term as used herein. The plug rotation is limited to about 90° by means of a stop pin 12 striking the ends of a recess formed for the purpose in the valve chamber wall.

The mechanism for imposing the proper resistance to plug turning, in the present case, involves the formation of a slot or channel in the body of the plug alongside its waterway, although as indicated, it can be otherwise arranged. The bottom surface 13 of this channel is presented at an oblique angle to the valve axis, and against the direction of the flow, in all intermediate positions of the plug. A water-actuated brake element 14 is mounted in this channel to slide on the channel bottom 13 being confined against escape by a cross-pin 15 passing through a hole 16 therein wide enough to accommodate its movement.

As thus located, the brake element 14, being exposed to the water flow, is pushed thereby along the surface 13 which causes its outer corner or toe to bear frictionally upon the inner surface of the valve chamber. This clutches the valve plug to such surface and in such a way, it will be observed, that the valve cannot be further closed except by overcoming the friction thus produced. Such friction varies generally with any change in water velocity and it is always adequate to offset the unbalanced forces which tend to close the valve, and need be no greater than will suffice for that purpose. The condition is thus established that the valve plug never turns harder than is necessary for safely holding its adjustment, and the packing gland never has to be tighter than will prevent leakage.

The brake element desirably fills the cross-section of the channel and it desirably works as a wedge, so that it clutches against movement in the closing direction, but opposes no resistance to opening movement. While this is preferred and has practical advantage the brake could obviously be arranged to resist in both directions.

It may be observed also that the brake element, as shown, and due to the special location of the channel in the plug, operates with better mechanical advantage when the channel surface 13 approaches parallelism with the longitudinal axis of the structure, because that gives a lower angle for the wedging action. This provides greater security in the early part, first 45°, of the closing movement when the closing forces are strongest and the danger of accident greatest.

From the foregoing it will be apparent that the principles above explained can be incorporated in valve structures in widely different forms of design all of which are intended to be within the scope of the claims hereof which follow.

I claim:

1. A turn-plug type valve comprising a valve chamber, a turn-plug therein having a surface exposed toward the flow and occupying an inclined relation thereto in the intermediate positions of said plug and a flow-actuated braking element movable on said surface to bear frictionally upon a surface of the chamber.

2. A turn-plug type valve for hose nozzles, comprising one member constituting a valve chamber and another member constituting a turn-plug therein, a brake movably mounted on one of said members for frictionally engaging a surface on the other member and having a part exposed to and actuated by the medium passing through said valve.

3. A turn-plug type valve for hose nozzles, comprising one member constituting a valve chamber and another member constituting a turn-plug therein, a brake movably mounted with respect to one of said members having a part for frictionally engaging a surface on the other member and also having a part exposed to and actuated by the velocity of the medium flowing through said valve.

4. A turn-plug type valve for a hose nozzle, comprising one member constituting a valve chamber and another member constituting a turn-plug therein, a brake movably mounted with respect to one of said members having a part for engaging the other member and also having a part exposed to and actuated by the velocity of the medium flowing through said valve, said brake having greater restraining action on the closing movement of the turn-plug than on its opening movement.

5. A turn-plug type valve for a hose nozzle, comprising a valve chamber and a turn-plug therein, a guideway formed on the turn-plug, a member movably mounted on said guideway for engaging a wall of the chamber and having a part exposed to and actuated by the velocity of the medium flowing through said valve.

6. A turn-plug type valve for a hose nozzle, comprising a valve chamber member, a turn-plug member therein, a guideway on one of such members, and a brake element movable on such guideway and exposed for actuation by the medium passing through the valve, and the other member having a surface engaged by said element also exposed to said medium.

7. A turn-plug type valve for hose nozzles, comprising a valve chamber, a turn-plug therein, a guideway formed on said turn-plug, a braking element movable on said guideway by the effect of the medium passing through the valve and means for confining said element to said guideway.

LEO S. ALDRICH.